J. R. TROTTER.
RIDING ATTACHMENT FOR HARROWS.
APPLICATION FILED FEB. 28, 1907.
912,048.
Patented Feb. 9, 1909.
3 SHEETS—SHEET 3.
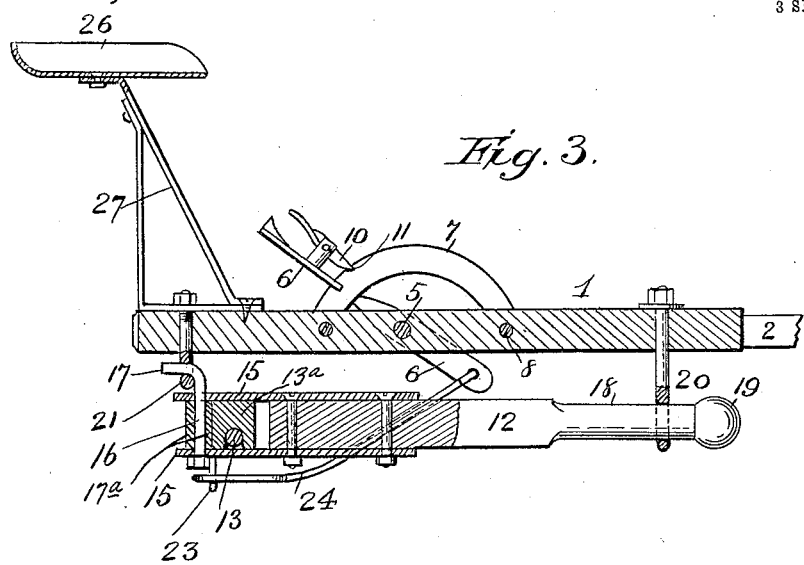
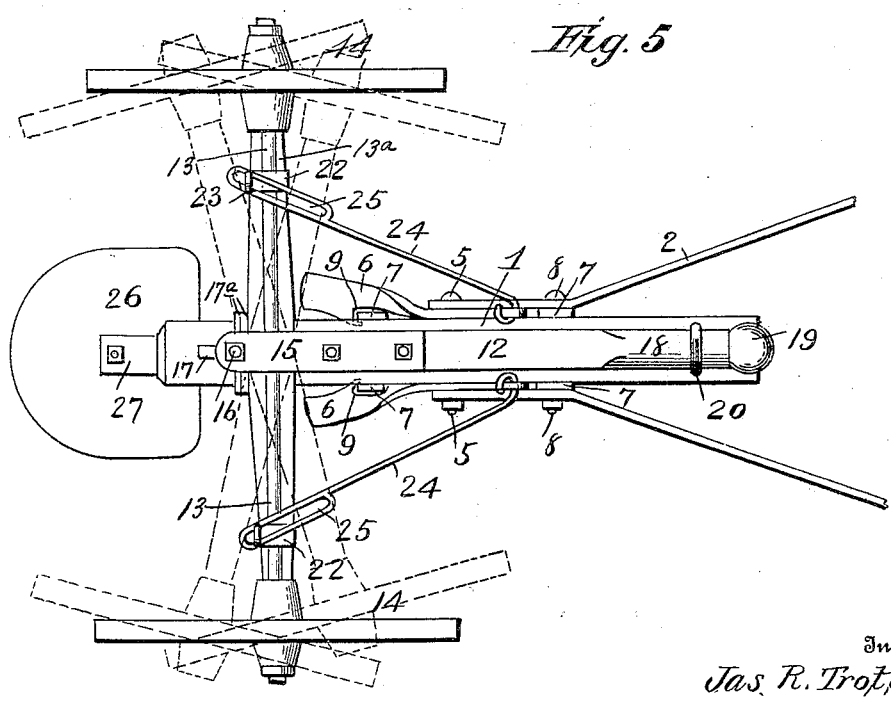
Inventor:
Jas. R. Trotter

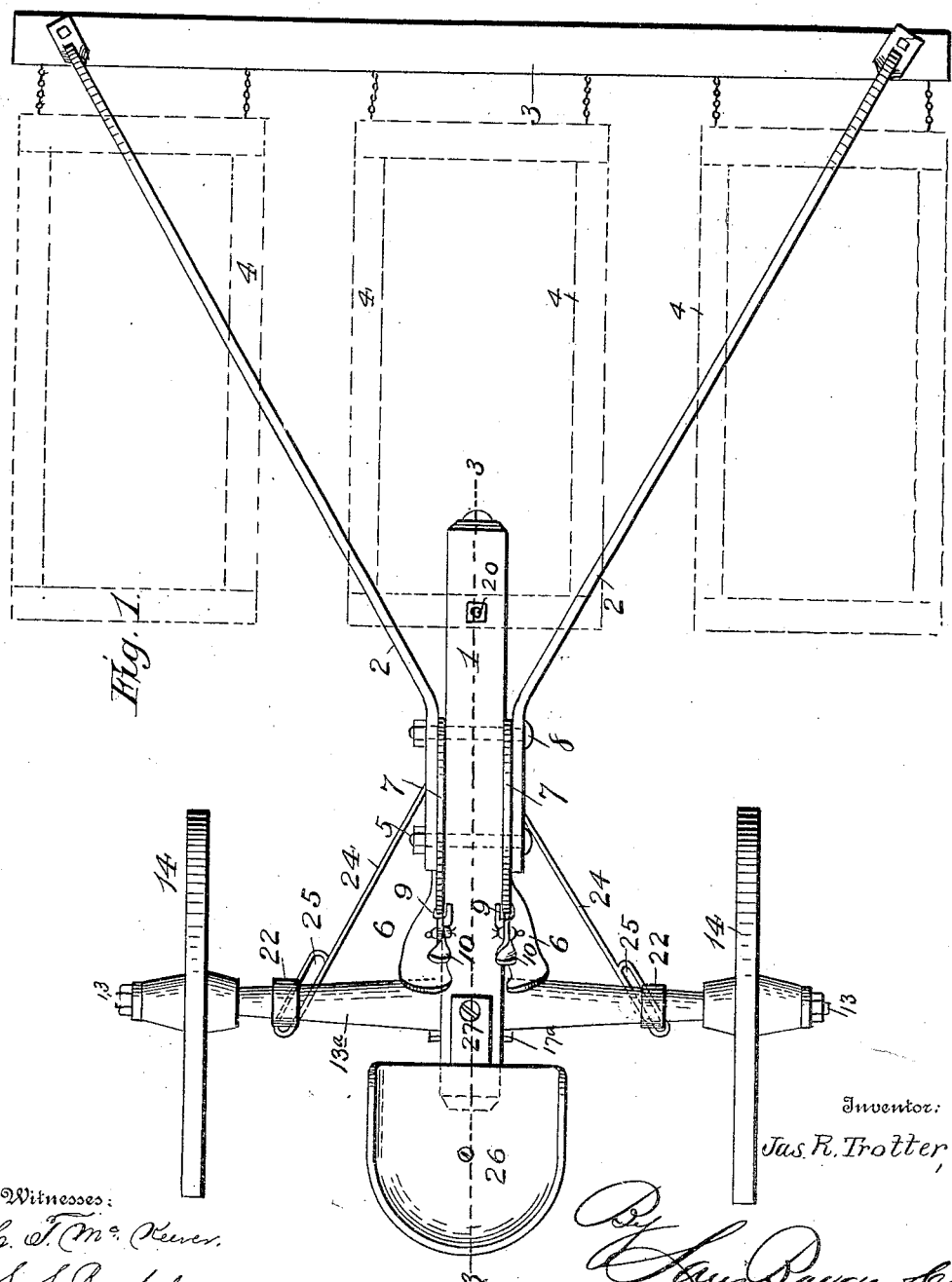

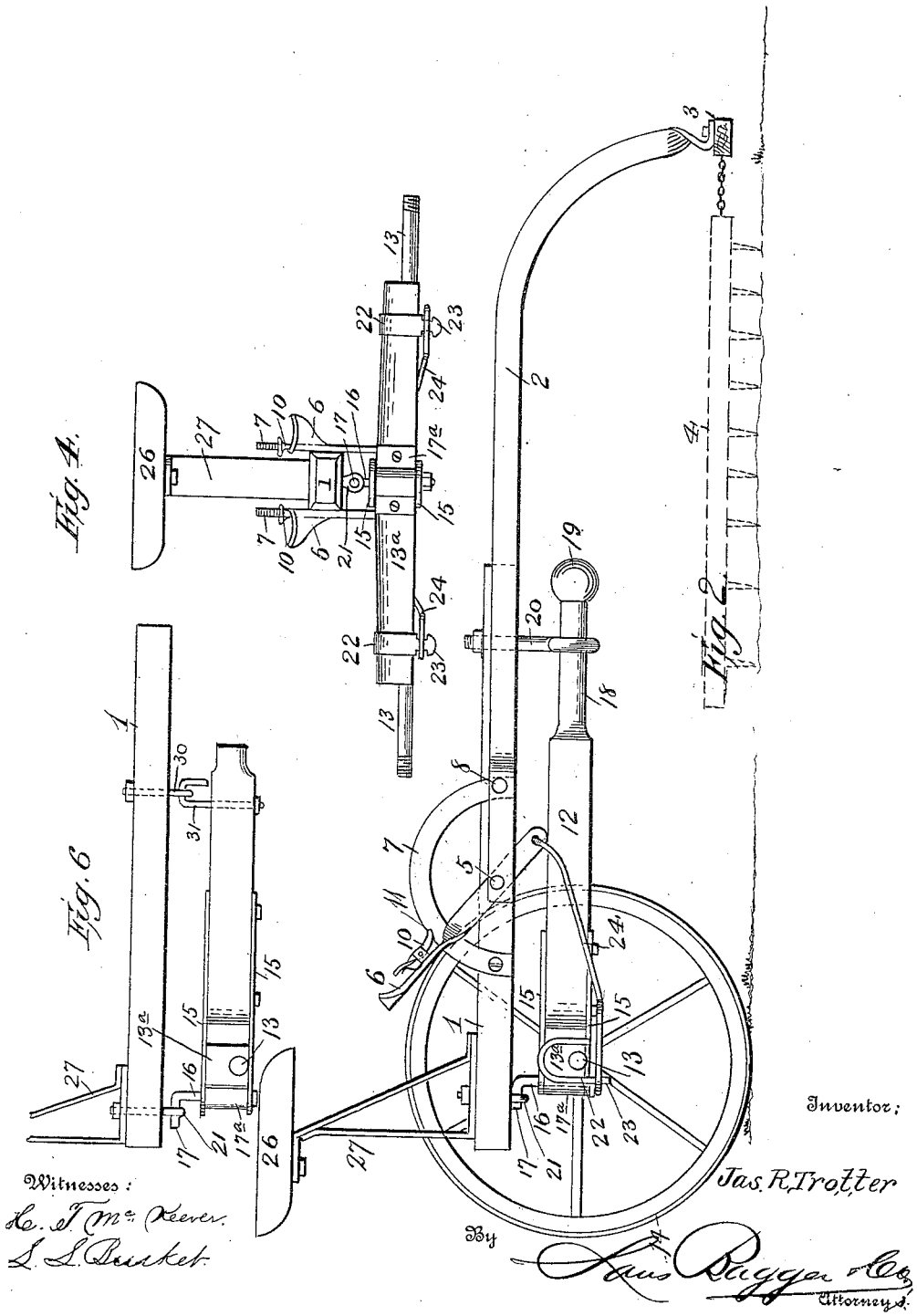

JAMES R. TROTTER, OF AURORA, IOWA.

RIDING ATTACHMENT FOR HARROWS.

No. 912,048.　　Specification of Letters Patent.　　Patented Feb. 9, 1909.

Application filed February 28, 1907. Serial No. 359,772.

*To all whom it may concern:*

Be it known that I, JAMES R. TROTTER, a citizen of the United States, residing at Aurora, in the county of Buchanan and State of Iowa, have invented certain new and useful Improvements in Riding Attachments for Harrows, of which the following is a specification.

This invention relates to riding attachments for harrows, such as are used in connection with harrows of ordinary construction for the purpose of enabling the operator to ride instead of walking behind the harrow.

The principal object of the present invention is to provide a riding attachment of simple and improved construction including the frame bar carrying a seat for the driver or operator, and a wheeled supporting truck, which is flexibly connected with the seat supporting bar, so that the latter shall be comparatively unaffected by inequalities in the ground, to which the truck will perfectly adapt itself.

A further object of the invention is to provide improved means for locking the axle of the truck with relation to the reach bar of the latter and for disconnecting the axle so as to admit of independent movement of the reach bar when turning corners at the ends of the field or when the harrow is being transported from one place to another.

Still further objects of the invention are to simplify and improve the general construction and operation of this class of devices.

With these and other ends in view, which will readily appear as the nature of the invention is better understood, the same consists in the improved construction, and novel arrangement and combination of parts, which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to, when desired.

In the drawings—Figure 1 is a top plan view of the improved riding attachment showing harrow sections of conventional construction connected therewith. Fig. 2 is a side elevation of the same. Fig. 3 is a longitudinal vertical sectional view, taken on the plane indicated by the line 3—3, Fig. 1. Fig. 4 is a rear elevation. Fig. 5 is a bottom plan view of the truck with dotted lines indicating various positions of the axle. Fig. 6 is a detail view, in side elevation, illustrating a slightly modified form of the invention.

Corresponding parts of the several figures are denoted by like characters of reference.

Secured upon the sides of the main frame bar 1, are a pair of forwardly divergent arms 2, 2, the forward ends of which are bent downwardly and secured upon and connected by the draw bar 3, to which, in practice, a harrow composed of one or more sections 4 is attached; the draft being applied to the draw bar 3 through the medium of an ordinary evener or equalizer, not shown.

The bolt 5 which serves to secure the rear extremities of the arms 2, 2, upon the frame bar 1, also serves to support the foot levers 6, 6, which are interposed between the frame bar 1, and the arms 2, 2; likewise interposed between said arms and frame bar are the forward ends of a pair of arcuate brackets 7, 7, which are secured by means of the transverse bolts 8; the rear ends of said brackets being suitably secured upon the sides of the frame bar 1. The foot levers 6 have notches or recesses 9 engaging the arcuate brackets upon which the said foot levers are guided; said foot levers are also provided with suitably constructed spring actuated stops 10, adapted to engage notches 11 near the rear ends of the brackets, for the purpose of locking the said foot levers in position, when desired.

The truck of the improved device comprises a reach bar 12 and an axle which has been shown as a compound axle comprising a metallic rod or core 13, and a wooden portion 13ª in which the core is seated; at the ends of the axle transporting wheels 14 are mounted for rotation. The reach bar is provided with rearward extending brackets consisting of plates 15 secured upon the upper and under sides of said reach bar, and the axle is swiveled between said plates or brackets upon a bolt 16, having at its upper end a terminal hook 17; said bolt extending between clip plates, 17ª, upon the rear side of the axle. The forward end of the reach bar 12 has a tapered portion 18, provided with a terminal bulb 19, and said tapered portion, or neck, is supported by an eye-bolt 20, depending from the frame bar 1 near the front end of the latter; said frame bar is also provided near the rear end with an eye-bolt 21 in which the terminal hook 17 of the bolt 16 is supported. It will be seen that under the construction just described the reach bar 12 is so connected with the frame bar 1, as to be capable of a rocking or oscillatory movement, while the axle is also so connected with the reach bar as to be capable of swinging freely in an approximately horizontal plane.

The axle is provided with clips 22 having downward extending T-headed studs 23, said clips being disposed intermediate the reach bar and the wheels at no great distance from the latter; suitably connected with the lower ends of the foot levers are link rods 24, provided at their rear ends with slots 25 engaging the studs 23. By depressing the upper, or operating ends of the foot levers, in a rearward direction, the links 24 will be moved forward until the studs 23 engage or abut against the rear ends of the slots 25; when the levers are in this position, where they may be locked by the spring actuated stops 10 engaging the notches 11, the axle will be locked in a position approximately at right angles to the reach bar; when one or both of the foot levers are released and thrown in a forward direction, it is obvious that the truck axle will be free to swing in one or both directions to an extent limited by the length of the slots 25 in the link bars 24.

A seat 26 for the driver or operator is mounted upon a suitable seat support 27, near the rear end of the frame bar 1.

Instead of connecting the reach bar 12 with the main frame bar 1 at the forward end by means of the eye-bolt 20, as hereinbefore shown and described, it may under some circumstances be found desirable to employ the modified construction illustrated in Fig. 6; under said construction the main frame bar is provided at its forward end with an eye bolt 30 engaged by a hook bolt or staple 31, which is suitably connected with a reach bar. By this construction it is thought a more durable joint will be formed which is, in every respect, as effective as the one hereinbefore described.

From the foregoing description taken in connection with the drawings hereto annexed, the operation and advantages of this invention will be readily understood by those skilled in the art to which it appertains. In the construction of this improved riding attachment it has been endeavored to avoid multiplicity and unnecessary complication of parts and, on the other hand, to provide a riding device which will freely adapt itself to rough, hilly and uneven ground without unnecessarily jolting the seat. When the axle is locked with relation to the reach bar, by the simple and effective means provided for the purpose, the truck is compelled to follow steadily behind the harrow as long as the latter is progressing in a straight line; when turns are to be made, as at the ends of the field, the turning may be easily effected by temporarily unlocking or disengaging the lever controlling one end of the axle.

The improved riding attachment of this invention may be easily manufactured, at a moderate expense; it is simple, light, durable, easily disconnected or taken apart for shipment or storage, and it may be readily applied to and used in connection with harrows of ordinary construction.

I claim:

1. A riding attachment for harrows comprising a seat-carrying frame bar, a reach bar connected with the frame bar, an axle connected to the reach bar having wheels thereon, levers, and means connecting the levers with the axle for operating it.

2. A riding attachment for harrows comprising a seat-carrying frame bar, a reach bar connected to the frame bar, an axle having wheels thereon connected to the reach bar, levers, and means connecting the levers with the axle, and means on the frame bar for holding the levers in different positions for locking the axle.

3. In a riding attachment for harrows, a seat carrying frame bar having eye-bolts, a reach bar supported for oscillation by said eye-bolts and an axle swiveled upon the reach bar.

4. In a riding attachment for harrows a seat carrying frame bar, having eye-bolts, a reach bar supported at its forward end in one of said eye-bolts, a hook bolt connected with the reach bar and engaging one of the eye-bolts of the frame bar, and an axle swiveled upon the hook bolt.

5. In a riding attachment for harrows, a seat carrying frame bar, eye-bolts depending therefrom, a reach bar having a reduced portion at its forward end supported in one of the eye-bolts, plates extending rearwardly from the reach bar, a hook bolt connecting said plates and engaging one of the eye-bolts depending from the frame bar, and an axle swiveled upon said hook bolt between the rearward extending plates of the reach bar.

6. In a riding attachment for harrows a seat carrying frame bar, a reach bar connected therewith for oscillation, a wheel carrying axle swiveled upon the reach bar, forwardly extending divergent arms secured upon the frame bar, a draw bar connecting the forward ends of said arms and means for locking the axle to the reach bar.

7. In a riding attachment for harrows a seat carrying frame bar having forwardly extending divergent arms, a draw bar connecting said arms, an oscillatory reach bar supported by the frame bar, a wheel carrying axle swiveled upon the reach bar, foot levers fulcrumed upon the frame bar, and links connected with the foot levers and having terminal slots engaging studs connected with the axle.

8. In a riding attachment for harrows a seat carrying frame bar, an oscillatory reach bar connected therewith, an axle swiveled upon the reach bar, clips upon said axle having T-headed studs, foot levers fulcrumed upon the frame bar, and links connected with the foot levers and having terminal slots engaging the T-headed studs.

9. In a riding attachment for harrows a seat carrying frame bar having forwardly extending arms and a draw bar connecting said arms, arcuate brackets connected with said frame bar, foot levers fulcrumed upon the frame bar and having notches guided upon the arcuate brackets, spring actuated stops upon the foot levers engaging notches in the brackets, an oscillatory reach bar supported by the frame bar, an axle connected with the reach bar for swinging movement, clips upon said axle having T-headed studs, and slotted links engaging said studs and connected with the foot levers.

In testimony whereof I affix my signature, in presence of two witnesses.

JAMES R. TROTTER.

Witnesses:
 LOREN RISK,
 E. J. O'CONNOR.